Sept. 29, 1964 R. W. MAYHEW 3,150,951
METHOD FOR FORMING HOLLOW GLASS ARTICLES
Filed Nov. 18, 1960 3 Sheets-Sheet 1

INVENTOR.
RAY W. MAYHEW
BY W. A. SCHAICH &
E. S. HOLLER
ATTORNEYS

INVENTOR.
RAY W. MAYHEW
BY W. A. SCHAICH &
E. J. HOLLER
ATTORNEYS

Sept. 29, 1964  R. W. MAYHEW  3,150,951
METHOD FOR FORMING HOLLOW GLASS ARTICLES
Filed Nov. 18, 1960  3 Sheets-Sheet 3

INVENTOR.
RAY W. MAYHEW
BY
W. A. SCHAICH &
E. J. HOLLER
ATTORNEYS

United States Patent Office 3,150,951
Patented Sept. 29, 1964

3,150,951
METHOD FOR FORMING HOLLOW
GLASS ARTICLES
Ray W. Mayhew, Columbus, Ohio, assignor, by mesne assignments, to Owens-Illinois Glass Company, Toledo, Ohio, a corporation of Ohio
Filed Nov. 18, 1960, Ser. No. 70,193
4 Claims. (Cl. 65—71)

This invention relates to the manufacture of hollow articles by combined pressing and centrifugal molding action and, more specifically, to molding generally conical shaped hollow glass articles having large ends of non-circular contour.

The invention as herein illustrated and described is specifically adapted to the manufacture of hollow glass funnels or body members of cathode-ray picture tube envelopes for television reception and particularly tube envelopes having rectangularly shaped viewing screens.

Television pictures in both monochromatic and polychromatic transmission are transmitted having a rectangular pattern with a screen ratio of 4:5 and rectangularly shaped screens are conventional for recreating and displaying such pictures. Previously the prior art of manufacturing all-glass television picture tube envelopes provided circular viewing screens, however, such screens became obsolete due to the fact that peripheral areas of the transmitted pictures were lost and they could not efficiently be recreated on a screen of altogether different geometric outline. Commensurate with the increase in popularity of larger sizes of viewing screens and space requirements in making compact receivers rectangular screen tubes are now employed almost exclusively in the industry. More recently, the so-called wide-angle "square-look" tube envelopes have attained still further popularity in providing both larger and more definitely rectangular contoured viewing screens. Such envelopes also possess a reduction in overall tube length due to wide electron-beam deflection angles.

As presently manufactured, a cathode-ray picture tube envelope or bulb is made by separately fabricating a hollow glass face plate which provides the viewing screen and a hollow glass funnel which constitutes the tube body portion. These parts are subsequently sealed together at complemental edges of similar contour as by thermal fusion or other sealing means. More recently, the hollow funnel has been made by centrifugal molding action wherein a charge of molten glass is deposited in the apex area of a hollow upwardly-facing mold and the mold is immediately rotated about its vertical axis to form the hollow funnel. The large open end of the funnel is either initially formed with the desired contour or a moil portion is trimmed therefrom before sealing to the face plate member. A short tubular portion is usually formed integral with the hollow funnel at the apex area of the mold which portion is subsequently severed and replaced by a longer tubular neck member which retains the electron-beam-emitting gun or guns. The above steps are followed in making both circular and rectangular cathode-ray tube bulbs.

Heretofore, funnel members of picture tube envelopes of certain types, i.e. having prescribed beam deflection angles such as 70° and 90° and generally rectangular outline at their large ends, have been formed by centrifugal molding action by modifying the mold wall contours. In order to overcome the lack of uniform radial symmetry in a mold cavity having a non-circular contour at its large open end, mold wall contours at an intermediate area of the mold between its lower and upper regions have been modified to regulate the glass flow patterns during movement of the molten glass on spinning. This is done to obtain desired glass distribution over the mold wall especially during mold acceleration causing upward and outward movement of the glass. Modification of the mold wall contours has been practiced in forming certain non-circular shapes to obtain arrival of the leading edge of the advancing molten glass at the upper open end of the mold cavity in a uniform pattern and at substantially the same time along its complete periphery.

This has been accomplished to the extent it has been successful by varying the slope of the mold wall at an intermediate area adjacent the mold apex region in which the molten glass charge is deposited to control resistance to flow of the glass on accelerating rotation of the mold. This practice has been followed chiefly in the manufacture of funnel members for tubes having a beam deflection angle interiorly of the funnel small end of 70° or 90° and been limited thereto. Forming the rectangular outline of the funnel large end which can be defined as a modified ellipse consists of forming a series of modified ellipses in the intermediate area of the mold funnel extending in an axial direction wherein the major and minor axes of the elliptical contour thereat are in the opposite relationship as compared with the funnel large end. Such modification forms bulges on the short axis sides and generally flattened areas on the long axis sides in the intermediate transition zone of the funnel as molded. In order to overcome problems of angular movement or slippage of the molten glass over the contoured mold surfaces, it has also been found desirable particularly in making larger sizes of tube funnels to adjust the wall contour in the intermediate area to compensate for such slippage resulting from mold acceleration. The axes at least at a portion of the elliptically contoured area can be shifted forwardly in the direction of mold rotation to compensate for angular movement or slippage of the glass due to inertia. All of such correction has by necessity been built into the contour of certain molded articles as formed and been restrictive in designing new tube envelope shapes for fabrication by centrifugal molding. A mold construction for practicing such principles is illustrated in Patent No. 2,662,347 to Giffen, issued December 15, 1953, entitled "Glass Forming Molds."

Further, in the manufacture of funnel members for cathode-ray tube envelopes having both circular and rectangular large ends, it has been conventional to introduce a charge of molten glass into the upwardly-facing open-topped mold which is then rotated to distribute centrifugally the major portion of the glass charge over the wall of the mold while advancing a cylindrically-shaped tool downwardly into the tubular apex region of the mold to contact and shape the glass therewithin. Such forming of the apex area of the funnel is necessary to achieve formation of the funnel vortex region with desired wall thickness and acurately-contoured outwardly-flaring surfaces in an area of the mold where small moments of inertia are applied to the molten glass charge upon centrifugal casting. The prior art has shown the formation of the vortex end of the funnel simultaneously with mold rotation to provide cylindrical and conical contours thereat having truly circular cross-sections and desired wall thickness. Normally an electrical yoke element having a circular internal contour adapted to create an electromagnetic field to effect proper beam deflection and scanning of the viewing screen is mounted externally in close proximity to the juncture area of the funnel small end and its neck tubulation. Precise control over forming the contour and dimensions of the tube sidewalls in this region is imperative for satisfactory clearance and control of the cathode-ray electron beam which scans the tube screen. Where the deflected beam is surrounded by sidewalls which are circular in cross-section, and the raster which is scanned is rectangular in cross-section, the raster must be given proper clearance in the yoke region as well as adjacent areas of the funnel small end to prevent the formation of shadows at corners of the tube screen. This condition known as "neck-shadow" may occur when the deflected beam at the diagonals of its rectangular pattern is interrupted or distorted by the envelope sidewalls.

The normally cylindrical yoke area has recently been manufactured flaring at increasingly wider angles of divergence of electron beam deflection commensurate with practical tube design. The industry has proceeded from beam deflection angles increasing from 70° to 90°, and then to 110° and 114°, to overcome problems of excessive bulb weight and overall length of the picture tubes in providing large-size picture viewing screens. The latter beam angles are utilized in so-called wide-angle bulbs.

Cathode-ray tube envelopes and methods of forming the body portion thereof having improved electron beam deflection contours at the funnel small end are described and illustrated in the copending applications of Coleman and Mayhew, Serial Nos. 841,730 and 19,883, filed September 23, 1959, and April 4, 1960, respectively, both applications being assigned to a common assignee. These applications relate to tube envelope structures and methods of forming which provide more efficient use of beam deflection power by forming the inner surfaces of the funnel vortex area into a non-circular outline to facilitate the immergence of the rectangular raster as it is developed for scanning the full rectangular viewing screen.

The present invention, however, is directed toward overcoming the difficulties inherent in forming by centrifugal action tube funnels having a greater variation in radial symmetry at their large open ends due to both non-circular peripheral outline and greater variance of radial dimensions of larger sizes of tube funnels without affecting their final contours by the forming method.

Accordingly, it is an object of the present invention to provide a method of forming a hollow article of thermoplastic material having a non-circular outline at least at its area of maximum dimensions by combined pressing and centrifugal casting of a charge of thermoplastic material and to overcome various difficulties met within conventional forming methods.

Another object of this invention is to provide an improved method of forming a generally conically-shaped hollow glass article such as a funnel component of a television picture tube envelope by combinedly press-forming a localized sidewall region of the article into non-circular cross-sectional contour over at least the inner surfaces at its small end and distributing a still-moldable portion of the molten glass charge into a properly oriented distribution pattern to supply thermoplastic material to form the flaring major sidewall portions of the article by centrifugal casting.

Another object of the present invention is to provide a method of forming a funnel member of a cathode-ray television picture tube which is non-circular at prescribed areas of both its large and small ends for improved electron beam scanning of the screen or target area.

Another object of the present invention is to provide apparatus for forming the body portion component of a television picture tube envelope which has an essentially rectangular configuration at its large end and non-circular configuration over at least at the inner surfaces of its small end.

Another object of this invention is to provide an improved method of press-forming and centrifugally casting a hollow glass article having a rectangular cross-sectional contour at its large open end by initially press-forming a charge of molten glass into non-flowable rigid and flowable non-rigid portions, the former being formed into final form and the latter being properly distributed in temporary form for its centrifugal casting to form the major outwardly flaring sidewalls of the article.

A still further object of the present invention is to provide a method of forming a frusto-pyramidal shaped hollow glass member from a molten glass charge by pressing its vortex end into essentially rigid condition and concomitantly distributing a remaining flowable portion of said molten glass charge into a rectangularly-disposed pattern for centrifugal casting of this portion to form the outwardly-flaring major surfaces of said hollow member which terminate with a rectangular cross-sectional configuration.

The specific nature of this invention, as well as other objects and advantanges thereof, will become apparent to those skilled in the art from the following detailed description taken in conjunction with the annexed sheets of drawings on which, by way of preferred example only, are illustrated the preferred embodiments of this invention.

While this invention will be described hereinafter as specifically applicable to forming hollow glass bodies such as funnel members of cathode-ray picture tube envelopes, it will be readily apparent to those skilled in the art that the principles of the invention are equally applicable to forming many other types of hollow articles having modified frusto-conical or frusto-pyramidal configurations.

Figure 1:
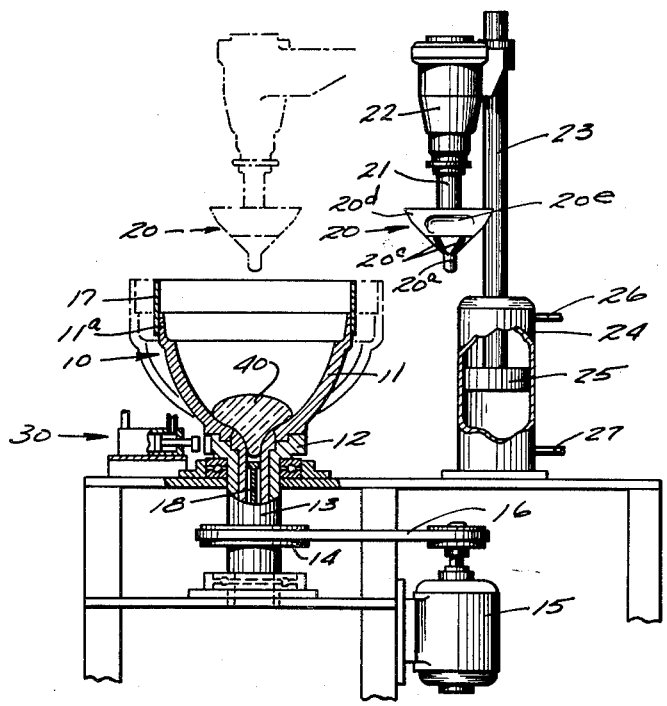
FIG. 1 is a part-sectional elevational view of a rotatable mold and cooperative press-forming and distributing apparatus for forming a hollow glass funnel member of a cathode-ray picture tube, the mold being shown in initially charged arrangement.

Referring now to the drawings and specifically FIG. 1, a mold 10, formed with a hollow body 11 and short tubular stem or extension 12, is mounted on a vertical rotary shaft 13 for rotation therewith about its vertical axis. Shaft 13 is retained on bearings and has a pulley 14 mounted thereon which may be driven by a motor 15 and an endless belt 16 or other source of power. In actual practice it is common to rotate the mold by a hydraulically actuated motor connected to drive shaft 13 through a clutch mechanism rather than the electric motor and belt arrangement as shown herein. The lower end of the mold cavity is closed by an ejector valve 18 vertically operable within extension 12.

A pressing and distributing tool 20 is mounted adjacent to mold 10 for movement into and out of the mold cavity as described hereinbelow. Tool 20 is mounted on a rigid shaft 21 which is in turn supported by a rock arm 22. Rock arm 22 is mounted for both lateral movement in a horizontal direction and vertical reciprocating movement into and out of the mold cavity to move the tool 20 into and out of cooperative pressing and distributing relationship with the mold bottom apex region. In FIG. 1, tool 20, its upporting shaft 21 and rock arm 22 are shown disposed at one side of the mold in solid lines for mold charging and article removal and, alternatively, in broken lines coaxially aligned over the mold.

Arm 22 is actuated by linkage to a reciprocating piston rod 23 which may be powered to operate in a vertical direction either mechanically or pneumatically. The downward movement of arm 22 may be limited by an adjustable stop (not shown) which may be threadedly mounted on a journaled shaft. Piston 25 is reciprocatingly moved within cylinder 24 to its prescribed upper and lower levels by pneumatic fluid introduced into cylinder 24 through inlet and outlet lines 26 and 27 and piston rod 23 is moved vertically thereby.

Rock arm 22 is moved laterally by a cam follower riding in a vertical groove as shown in U.S. Patent No. 2,861,394 to Ruff, issued November 25, 1958, entitled "Forming Glass Articles," which patent is assigned to the same parent assignee as the present application. Another form of pressing apparatus for use in conjunction with a rotatable mold having a non-circular outline at its upper end is disclosed in copending patent application of Prendergast and Stutske, Ser. No. 58,562 filed September 26, 1960, and entitled "Method of and Apparatus for Making a Glass Article," this application being assigned to Owens-Illinois Glass Company, the parent company of the assignee of the instant application. Both of the aforementioned disclosures relate to plunger mechanisms which have frusto-conical upper surfaces for use in conjunction with the rotary mold. In the former disclosure the plunger has completely circular contiguous cylindrical and frusto-conical surfaces and in the latter disclosure this element has modified non-circular surfaces at its lower end for press-forming the small end of the funnel with non-circular internal contour.

Referring again to FIG. 1 lateral displacement of arm 22 away from the mold 10 permits the introduction of a charge 40 of molten glass into the mold. With the molten glass charge deposited in the mold and pressing and distributing tool 20 disposed in its extended position coaxially and coangularly aligned over the mold the pressing operation is initiated.

Figure 2:
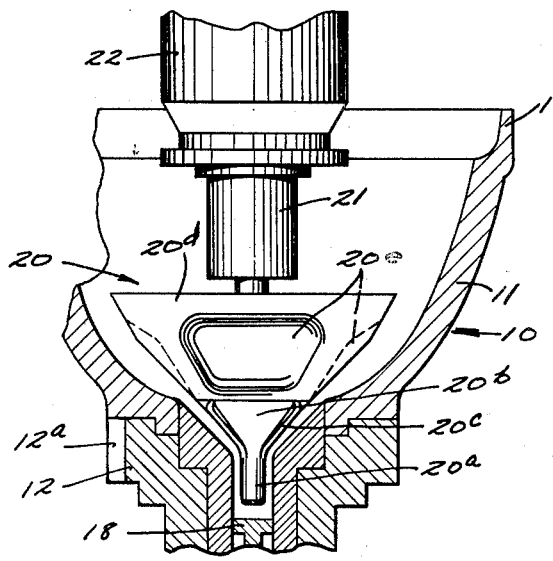
FIG. 2 is an enlarged partial vertical sectional view showing the press-forming and distributing apparatus in cooperative arrangement with the rotatable mold during the pressing step without the mold being charged.
Figure 3:
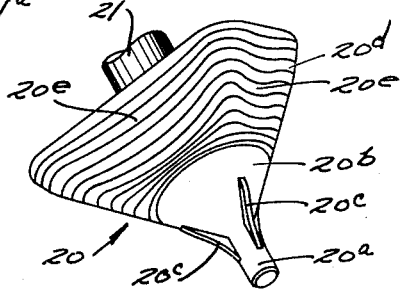
FIG. 3 is a perspective view of the press-forming and distributing plunger mechanism only shown in FIGS. 1 and 2.

As shown in FIGS. 1, 2 and 3 pressing tool 20 comprises a short cylindrical section 20a at its lower extremity integral with and merging into a generally frusto-conical section 20b generally similar to the shape of the funnel apex region. The frusto-conical surfaces 20b have a spaced-apart series of radially and peripherally projecting protuberances or lugs 20c adapted to shape the central upper surfaces of the glass charge 40 during pressing with an upwardly-facing peripherally-spaced rectangular pattern of radial grooves or depressions 40c. Tool 20 has essentially modified frusto-pyramidal surfaces 20d above frusto-conical surfaces 20b adapted to serve a charge distributing function when in engagement with an upper portion of the glass charge during pressing. The lower edge of frusto-pyramidal surfaces 20d blend smoothly into the circular upper edge of frusto-conical surfaces 20b and flare upwardly and outwardly therefrom. Frusto-pyramidal surfaces 20d comprise a distributing skirt for forming a flowable still-workable upper portion of the glass charge during press forming of the charged lower portion into rigid non-flowable condition. The distributing skirt has a spaced-apart series of smoothly contoured concave recesses 20e centrally disposed within its generally flattened sides facing and in alignment with the sides of the rectangular upper end of mold 11. Skirt 20d is hollow to minimize chilling of the glass while the lower frusto-conical surfaces 20b are part of a solid body.

The large open end of mold body 11 is generally rectangular in shape having a ledge portion 11a which is surrounded by an annular ring 17. Ledge 11a of the mold body and retaining ring 17 conjunctively serve to restrain the uppermost portion of the glass during centrifugal spinning to form an integral moil and prevent accidental discharge of any portion of the molten glass charge from the mold during rotation.

Figure 4:
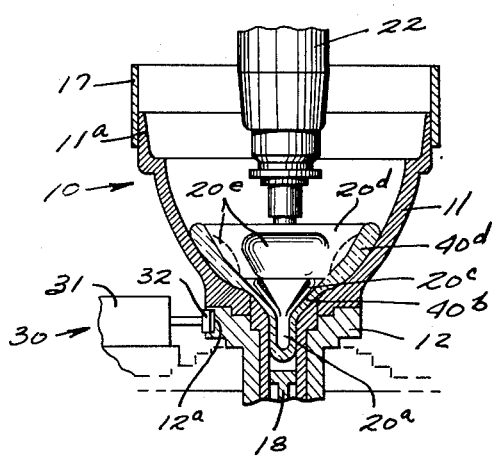
FIG. 4 is a partial vertical sectional view showing the rotatable mold and press-forming and distributing apparatus in cooperative aligned arrangement during the pressing and distributing step illustrating initial formation of a molten glass charge.

An upper portion of mold extension 12 has a recess 12a formed in an external region to facilitate the engagement of a locking device 30 to index the mold 10 into proper coangular orientation with pressing tool 20. Indexing and locking device 30 consists of an air cylinder motor 31 with an indexing lug 32 adapted to project into recess 12a for proper axial orientation of the mold and pressing tool. Thus, with pressing tool 20 brought over the mold 10 in fixed lateral arrangement and with the mold retained in positive angular alignment with lug 32 engaged within recess 12a as shown in FIG. 4, pressing and distributing of molten glass gob 40 can be effected. Where the large open end of mold 11 is rectangular in shape in geometric symmetry with its vertical axis, the lower region of the mold may have a pair of recesses 12a in oppositely-aligned arrangement for indexing the mold in either one of two positions.

According to the present method, molten glass charge 40 is deposited in hollow mold 10 at its apex region while the mold is stationary or rotating at a very slow rate (FIG. 1). Within a very brief interval of time during which the charge is permitted to settle into the mold apex region, pressing tool 20 and mold 10 are moved into proper alignment. This is accomplished either by first charging the mold and then indexing the same to a position beneath tool 20, or charging the mold and then laterally moving the tool over the mold into coaxial and coangular alignment.

Figure 7:
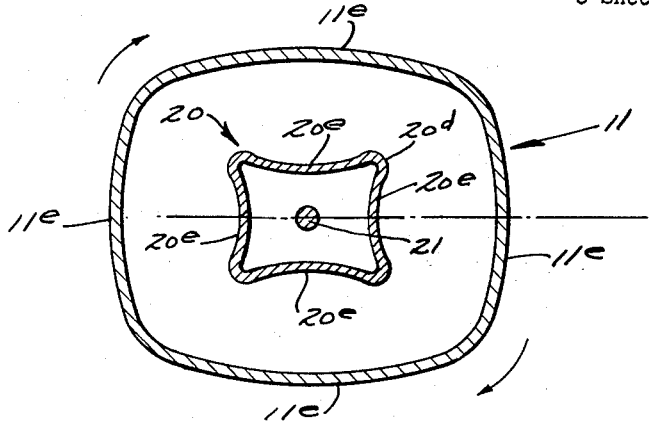
FIG. 7 is a horizontal sectional view of the charge distributing portion of the pressing plunger and the upper region of the mold taken along the line 7—7 of FIG. 5.

The prescribed alignment as shown in FIGS. 2 and 7 consists of the diagonals at the large end of mold 10 being co-radial with the radially extending protuberances 20c on the frusto-conical surfaces 20b of the plunger. The spaced-apart series of recesses 20e of the distributing skirt are preferably aligned opposite the flattened sides of the mold upper end. With the mold and pressing tool in proper alignment both axially and angularly tool 20 is moved downwardly by cylinder 24 to press form a localized central region of the charge into non-circular configuration as shown in FIG. 4. The cylindrical portion 20a of the pressing tool penetrates the lower apex area and cylindrical portion of body mold 11 and mold extension 12 in vertical alignment therewith. The mold surfaces at this area are preferably circular and cylindrical or, alternatively, they may be generally rectangular in horizontal cross section. The distributing skirt 20d of the tool has a properly contoured configuration to temporarily form the upper portion of the charge into a rectangular pattern of flowable concentrated masses immediately above the finally pressed essentially rigid portion. At this time a minimal amount of glass is deposited in the diagonal regions of the mold transition area while greater amounts of the flowable portion of the charge are disposed facing the center of the rectangular sides 11e of the mold upper end respectively. The recesses are formed so that they have longer lateral extent and lesser depth on the short axis sides of the mold upper end and shorter lateral extent and greater depth on the long axis sides of mold upper end respectively.

Immediately following formation of the central localized portion 40b of the glass charge in the apex area of the mold, pressing tool 20 is substantially withdrawn from contact with the glass by operation of air cylinder motor 24 and upward travel of piston rod 23. Glass portion 40b at this time is pressed relatively thin and is cooled and chilled by the combined action of the tool and mold to establish an initially non-flowable condition for this portion while the upper remaining portion 40d of the charge of greater mass is still in flowable essentially non-rigid condition having a sufficiently low viscosity for further working.

Figure 5:
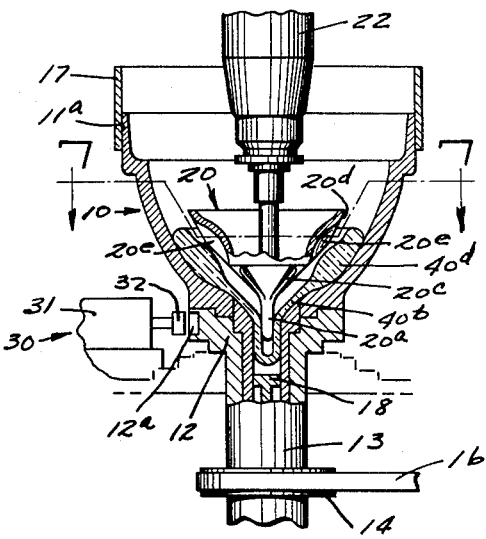
FIG. 5 is a view similar to FIG. 4 showing the press-forming apparatus partially withdrawn from contact with the press-formed and distributed molten glass charge intermediate of press forming and centrifugal casting.

After at least partial upward withdrawal of tool 20 as shown in FIG. 5 locking lug 32 is withdrawn from contact with mold recess 12a by operation of the air cylinder motor 31. Mold 10 is immediately rotated rapidly about its vertical axis in order to distribute the flowable glass portion 40d upwardly and outwardly along sides of the mold by centrifugal action. The mold is rotated at sufficient angular velocity over a sufficient interval of time to spread and mold the remaining glass over the flaring mold sidewalls. By concentrating greater masses of flowable glass facing the central regions of the flattened sides of the mold open end, and with minimal amounts of flowable glass disposed at the mold diagonal regions, upon rotation of the mold the leading edge of the glass is caused to move upwardly and outwardly in a controlled manner advancing in an upwardly progressing generally horizontal plane to arrive at mold ledge 11a at substantially the same time.

Figure 6:
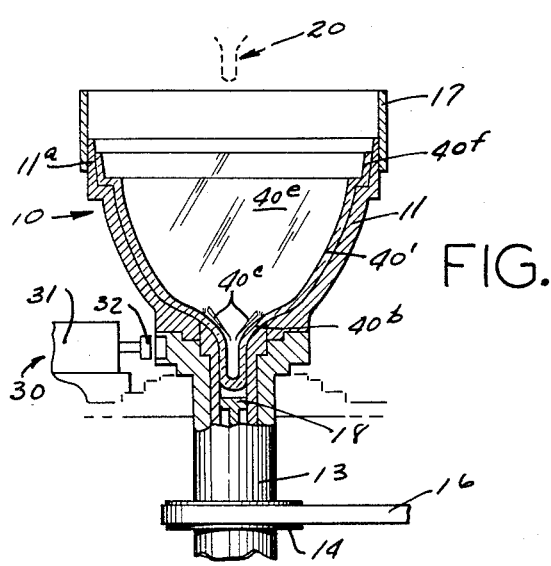
FIG. 6 is a view similar to FIG. 4 showing the rotatable mold and finally molded article following rotation of the mold with the press forming apparatus in fully withdrawn arrangement.

After the complete flaring sidewalls 40e of the funnel are formed by centrifugal casting, the mold is decelerated and stopped and the molded article is cooled and hardened into final form. As illustrated in FIG. 6 the glass has moved upwardly over the entire sidewall surfaces of body mold 11 and into and above its ledge portion 11a, the glass thereabove comprising an integral moil portion 40f of the final article which is subsequently separated. The inner surfaces of the small end of the funnel are formed having a spaced-apart series of peripherally extending grooves or recesses 40c of considerable longitudinal extent. It is also preferred that these grooves each have an appreciable angular extent of the order of about 10° to 20°.

During rotation the central lower apex area of the molded article which is initially pressed into non-circular configuration at least over its inner surfaces remains essentially rigid and uneffected during spinning of the distributed portion 40d of the charge, the lower portion having been chilled to such a degree by the thinning action of the mold and tool. Thus, the centrifugal force applied to flowable portion 40d does not adversely affect the non-circular configuration of the glass in the lower region on spinning. Press forming of the yoke area internally of the small end of the funnel 40' into a configuration which is basically circular with spaced indentations provides improved clearance and control over electron beam deflection in the final tube.

Thus, it is readily apparent how the excess glass from physically pressing the small end portion of the funnel is either forced downwardly into mold extension 12 to form the tubular so-called "nubbin" portion of the article or upwardly away from and around frusto-pyramidal surfaces 20d of the tool. The lower short tubular portion of the article is subsequently separated therefrom and a longer length of neck tubulation joined thereto in subsequent envelope forming operations. FIG. 6 illustrates the newly-formed rectangular funnel member having a rectangular pattern of radially-projecting internal grooves 40c formed in the same orientation as the diagonals of its large rectangular open end.

Following formation of the funnel and preferably immediately subsequent to completion of the spinning cycle, an upper region of the funnel large open end is scored internally immediately below mold ledge 11a. This is accomplished while the article is still retained in the mold and as the mold is slowly rotated. After this scoring operation and when the article is fully set in hardened condition, ejector valve 18 in the mold bottom is moved upwardly to separate the molded funnel from the mold sidewalls. After removal of the funnel from the mold, the moil portion 40f is then eliminated by any conventional means as known in the art.

FIG. 7 is a horizontal sectional view taken through the tool distributing skirt portion 20d and an upper region of the mold open end shows one form of orientation of the tool 20 having the glass accumulating pockets or recesses 20e disposed in directly opposite alignment and facing the flattened sides 11e of the mold upper end. It is to be understood that the mold wall contour on the same horizontal level as pockets or recesses 20e in cooperative distributing relation can be circular or slightly rectangular in configuration. The glass is distributed into accumulated masses facing prescribed areas of the mold upper end having lesser radial extent than its diagonals. The glass is distributed by recesses 20e in a manner such that a lesser amount of moldable glass is deposited in the mold diagonals having greater radial extent at the mold upper end while greater amounts are deposited facing the flattened sides having lesser radial extent. It is readily apparent how the glass is more quickly and expeditiously delivered into the diagonal areas of the mold upper end during spinning and in accordance with this invention the desirability of displacing the flowable upper portion of the charge in proper orientation during press forming of the lower region promotes and facilitates improved formation of the funnel major surfaces.

Figure 7A:
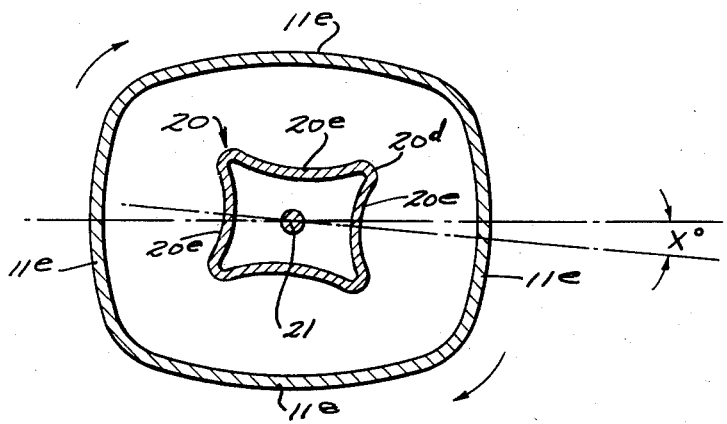
FIG. 7a is a view similar to FIG. 7 showing a modification of the orientation of the distributing portion of the press-forming plunger and rotatable mold during press forming and distributing of the glass charge.

In another form of the invention as shown in FIG. 7a the skirt portion 20d of the tool 20 is rotated through a prescribed angle of X degrees which may vary from 1–5°, for example. The accumulation forming pockets 20e of the distributing skirt are moved forwardly in the direction of angular rotation of the mold (clockwise as shown) to compensate for slippage or angular movement of the glass rearwardly upon acceleration of the mold on spinning. It is preferred in this embodiment of the invention that the radial protuberances 20c utilized to internally press form the surfaces of the funnel small end be aligned in the same angular orientation as the funnel diagonals and the skirt portion only including pockets 20e be placed askew the prescribed angle.

Figure 8:
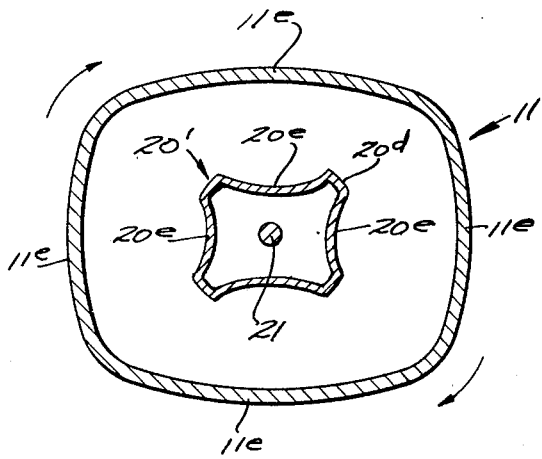
FIG. 8 is a view similar to FIGS. 7 and 7a showing another embodiment of the distributing portion of the press-forming plunger.

In another embodiment of the invention as shown in FIG. 8 the distributing skirt is given another form of configuration. In order to further compensate for the problem of slippage and rearward angular movement of the glass during accelerating rotation of the mold in a clockwise direction, opposing diagonal areas of the skirt are given a sharper corner contour. Also the leading edge of the short axis side of the funnel is given a greater radial extent and those facing the leading edge of the long axis side are given a lesser radial extent. This cross-sectional configuration has utility in forming certain types of wide-angle funnels.

Various modifications may be resorted to within the spirit and scope of the appended claims.

I claim:

1. In a method of centrifugally casting a hollow glass article having a generally frusto-pyramidal shape in a rotatable open-topped mold having distinct somewhat arcuate sidewalls joined at radiused corners, said side walls flaring upwardly and outwardly from a lower apex portion, by the steps of introducing a charge of molten glass into the apex portion of the mold, inserting a pressing plunger into the mold and into contact with the glass charge therein, and finally rapidly rotating the mold to centrifugally move the major portion of the charge to and along the flaring side walls of the mold, the improvements, performed prior to rapid rotation of the mold, of utilizing said pressing plunger to carry out the steps of (1) press-forming a lower portion of the charge to a final, essentially rigid shape conforming to a finished portion of said article and (2) distributing an upper portion of the charge so that those portions of the charge subsequently moved to and along the corners of the mold are of reduced mass and those portions of the charge subsequently moved to and along the side walls of the mold are of increased mass, said step (2) being carried out without cooling the upper portion of the charge to an extent such that the mobility thereof is substantially hampered.

2. In the method as defined in claim 1, the further improvement of removing the pressing plunger from contact with the charge prior to rapid rotation of the mold.

3. In a method of centrifugally casting a hollow glass article of generally frusto-pyramidal shape in a rotatable open-topped mold conforming at its inner surfaces to the exterior of said article and including side walls joined to one another at radiused corners and flaring upwardly and outwardly from a lower apex portion, the method including the rapid rotation of the mold to move along said side walls and into said corners glass from a gob placed at the mold apex, the improvements of (1) inserting a distribution element into said mold, (2) reducing the mass of glass adjacent each mold corner and increasing the mass of glass adjacent each mold side wall by contact of said distribution element with said gob, and (3) terminating gob-element contact before substantial chilling of said gob and before centrifugally casting said article.

4. In a method as defined in claim 3, the further improvement of orienting the distribution element rotationally relative to the mold to compensate for angular movement of the glass upon acceleration of the mold during casting.

References Cited in the file of this patent

UNITED STATES PATENTS

| | | |
|---|---|---|
| 461,489 | Ripley | Oct. 20, 1891 |
| 2,238,198 | Weber | Apr. 15, 1941 |
| 2,591,521 | De Gier | Apr. 1, 1952 |
| 2,662,346 | Giffen | Dec. 15, 1953 |
| 2,696,699 | Giffen | Dec. 14, 1954 |
| 2,853,834 | Vincent | Sept. 30, 1958 |
| 2,861,394 | Ruff | Nov. 25, 1958 |

FOREIGN PATENTS

| | | |
|---|---|---|
| 806,761 | Great Britain | Dec. 31, 1958 |

OTHER REFERENCES

Germany (Wertheim), patent anmeldung g11670 1, vc/32a Bekanntgemacht am 7. June 1956, A. (Copy in Div. 91, Class 49, Subclass 29C.)